(12) United States Patent
Pursifull et al.

(10) Patent No.: US 8,209,981 B2
(45) Date of Patent: Jul. 3, 2012

(54) METHODS AND SYSTEMS FOR ENGINE CONTROL

(75) Inventors: Ross Dykstra Pursifull, Dearborn, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/350,328

(22) Filed: Jan. 13, 2012

(65) Prior Publication Data
US 2012/0111305 A1 May 10, 2012

Related U.S. Application Data

(63) Continuation of application No. 12/474,069, filed on May 28, 2009, now Pat. No. 8,109,092.

(51) Int. Cl.
*F02B 33/44* (2006.01)
(52) U.S. Cl. ........................... 60/607; 123/559.1
(58) Field of Classification Search .............. 60/607, 60/601–602; 123/559.1, 21, 179.3, 179.5
See application file for complete search history.

(56) References Cited

U.S. PATENT DOCUMENTS

| 3,945,348 | A | * | 3/1976 | Balve ..................... 123/18 R |
| 4,392,459 | A | | 7/1983 | Chareire |
| 5,022,353 | A | | 6/1991 | Kamamura |
| 6,615,771 | B2 | | 9/2003 | Denger et al. |
| 6,971,338 | B2 | | 12/2005 | Kobayashi et al. |
| 2006/0096273 | A1 | * | 5/2006 | Soliman et al. .............. 60/285 |
| 2006/0096275 | A1 | * | 5/2006 | Robel et al. ................ 60/286 |
| 2006/0254550 | A1 | | 11/2006 | Lewis et al. |
| 2007/0006576 | A1 | * | 1/2007 | Persson et al. .............. 60/295 |
| 2007/0062180 | A1 | * | 3/2007 | Weber et al. ............... 60/286 |
| 2007/0101706 | A1 | * | 5/2007 | Harris et al. ............... 60/312 |
| 2007/0113542 | A1 | * | 5/2007 | Lewis ....................... 60/285 |
| 2007/0295008 | A1 | * | 12/2007 | Shuttleworth ........... 60/605.2 |
| 2010/0300383 | A1 | * | 12/2010 | Pursifull et al. ............ 123/21 |

FOREIGN PATENT DOCUMENTS
GB  2373020 A  9/2002
* cited by examiner

*Primary Examiner* — Thanh Lam
(74) *Attorney, Agent, or Firm* — Allan J. Lippa; Alleman Hall McCoy Russell & Tuttle LLP

(57) ABSTRACT

Methods and systems for controlling an engine are provided. In some examples, the engine has at least a cylinder and a compression device coupled to an intake of the engine, and the method includes, during engine re-start operation of an engine idle-stop condition, commencing combustion in the cylinder from a non-combusting condition, the combustion in a two-stroke combustion cycle of the cylinder. However, in some examples, at least partially electrically powered boosting operation may also be used to extend the two-stroke operation during a start.

20 Claims, 8 Drawing Sheets

METHODS AND SYSTEMS FOR ENGINE CONTROL

CROSS REFERENCE TO RELATED APPLICATIONS

The present application is a continuation of U.S. patent application Ser. No. 12/474,069 filed May 28, 2009, the entire contents of which are incorporated herein by reference for all purposes.

FIELD

The present application relates to methods and systems for controlling an engine.

BACKGROUND & SUMMARY

Engines may operate with a variable number of strokes in a combustion cycle. For example, an engine may be configured to operate in a first mode with cylinders carrying out combustion in a two-stroke combustion cycle, and further to operate in a second mode with cylinders carrying out combustion in a two-stroke combustion cycle. The engine may transition, during engine operation, between these modes with various valve systems, such as cam switching actuators, electric cylinder valve actuators, etc.

In one example, the engine may commence combustion with a two-stroke combustion cycle in a cylinder. One such example is described in US 2006-0254550, which describes commencing combustion with a plurality of cylinders having combustion in a commonly aligned stroke, and the increasing/decreasing the number of strokes in a cylinder to return to a desired, sequential, firing order, for example.

The inventors herein have recognized some issues with the above approaches, in that commencing combustion out of the firing order sequence in order to have two cylinders firing at the same time may generate unacceptable noise, vibration, and harshness, especially during engine idle-stop and related re-start conditions.

As such, the above issues may be at least partially addressed by a method of starting an engine, the engine having at least a cylinder and a compression device coupled to an intake of the engine, the method comprising: during engine re-start operation of an engine idle-stop condition, commencing combustion in the cylinder from a non-combusting condition, the combustion in a two-stroke combustion cycle of the cylinder. Such starting may take advantage of the ability of the engine to handle two-stroke combustion in the first combustion event, since residuals from previous combustion are substantially not present, even with insufficient boost (such as when electrically powered boost is unavailable due to low battery state of charge, etc.). Further, such starting can take advantage of an already warmed-up engine present during idle-stop/restart conditions.

However, in some examples, at least partially electrically powered boosting operation may also be used to extend the two-stroke operation during a start, thus further reducing engine starting time and improving vehicle launch from idle-stop operation. Such operation is particularly beneficial since exhaust flow during idle-stop re-starts may be insufficient to generate boost levels that can enable two-stroke operation in a poppet valve engine.

It should be understood that the background and summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 5:
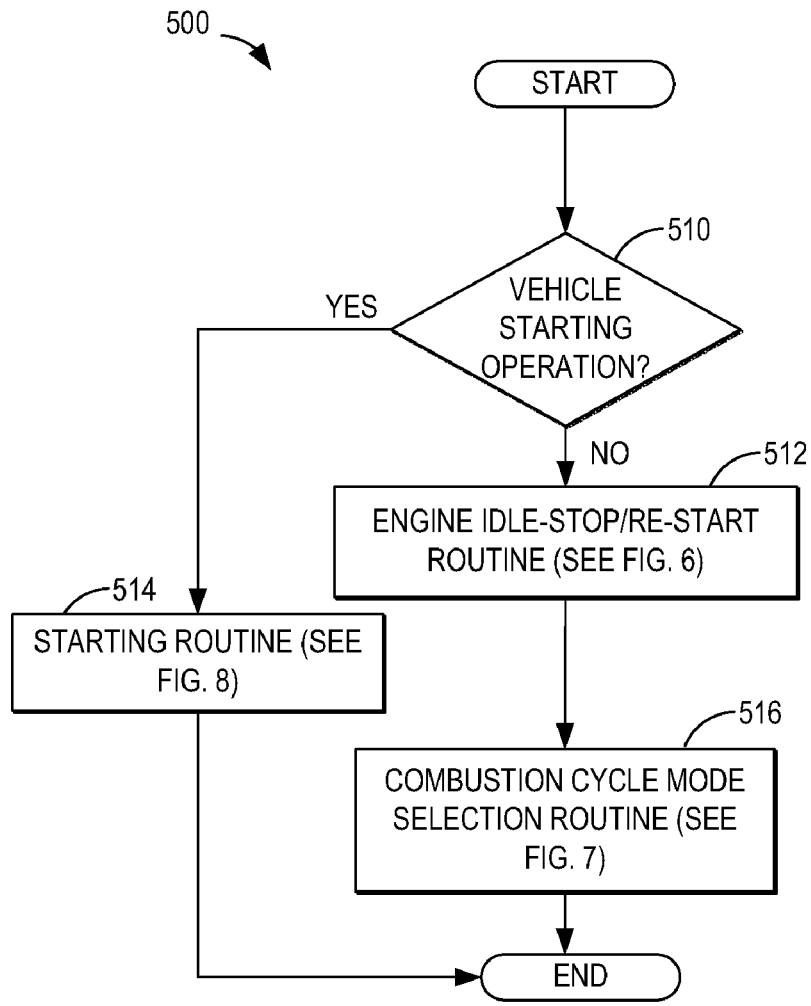
FIGS. 5-9 show high level flow charts for executing various actions carried out by the systems of FIGS. 1-2.
Figure 6:
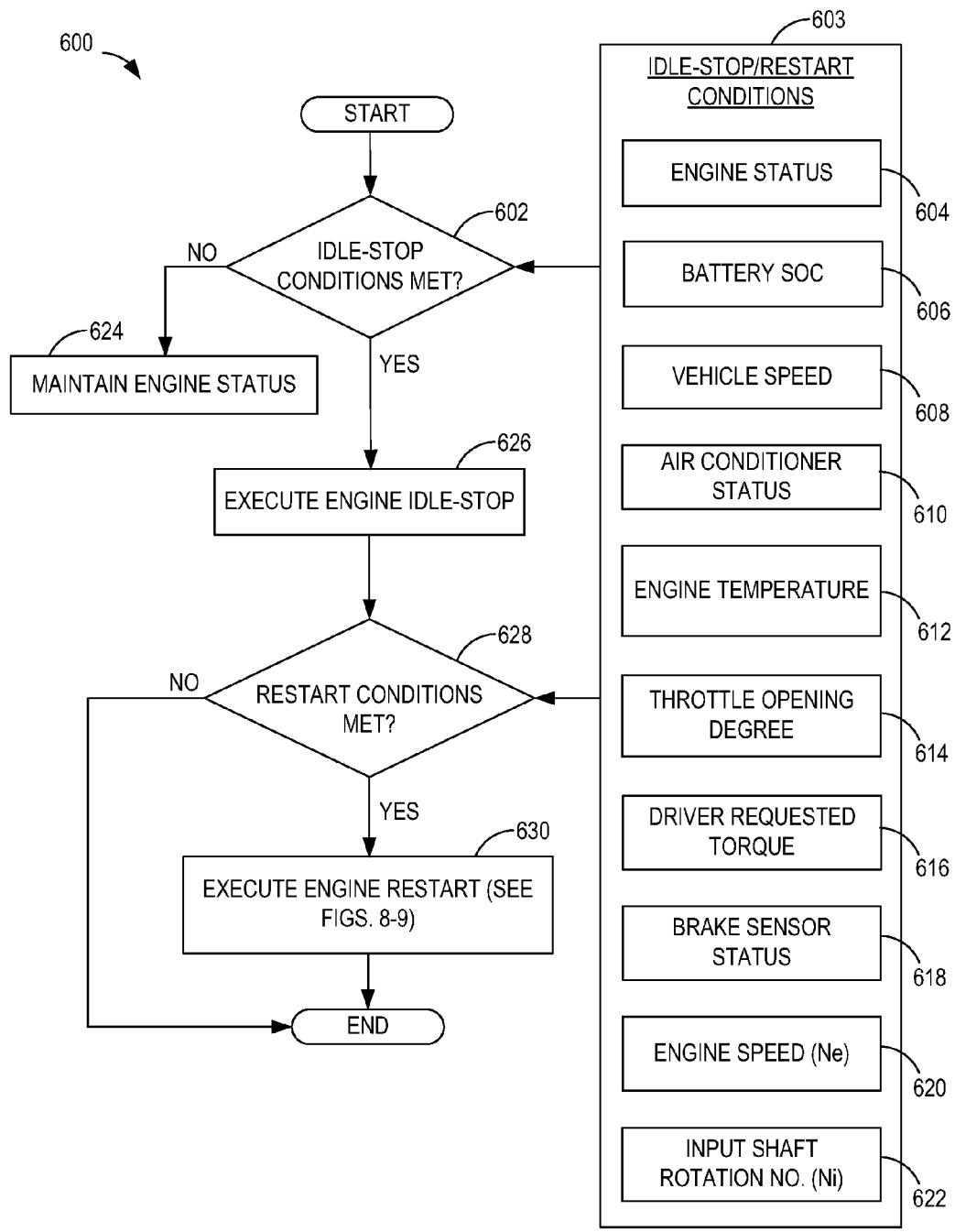
Figure 7:
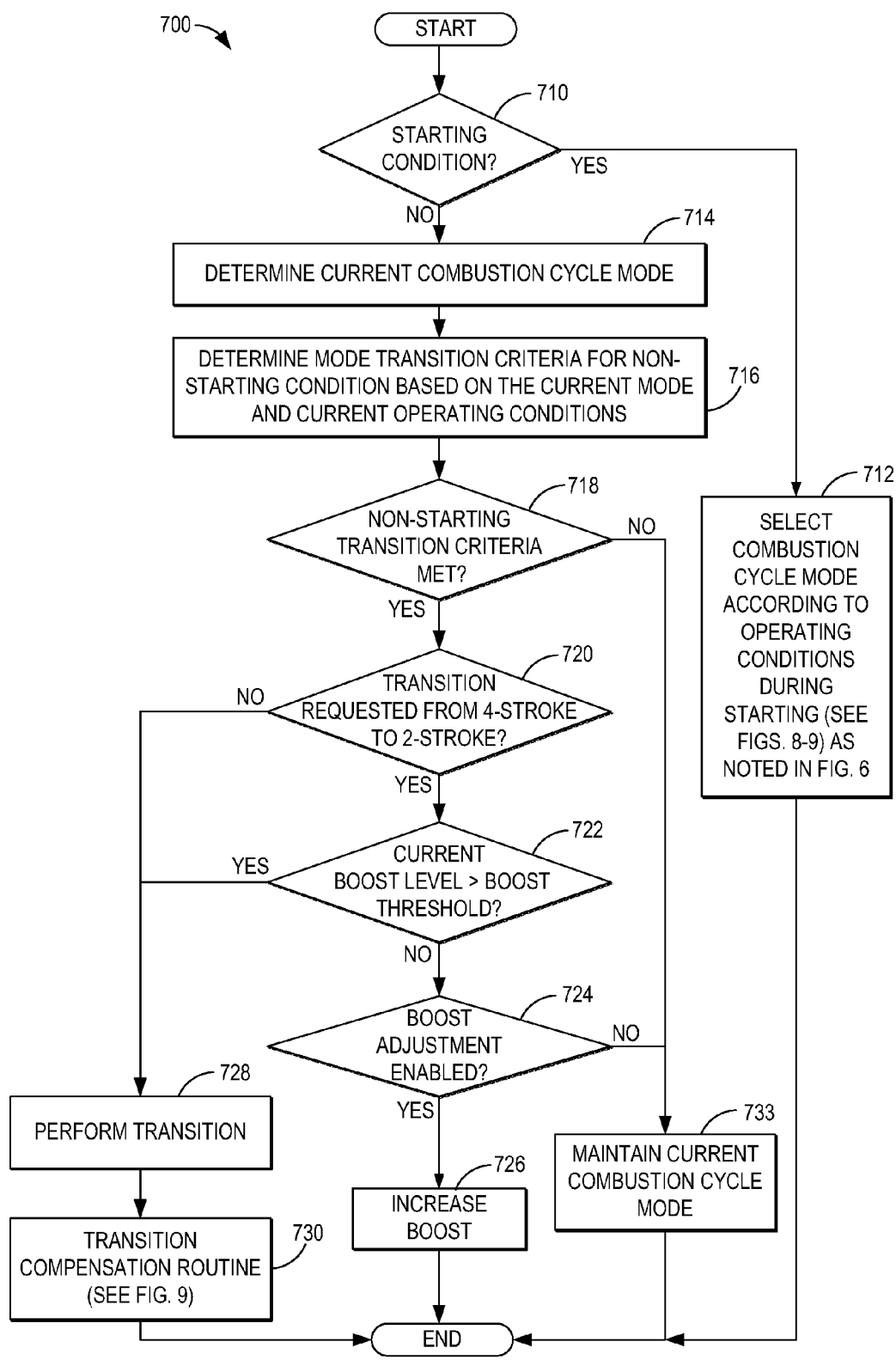
Figure 8:
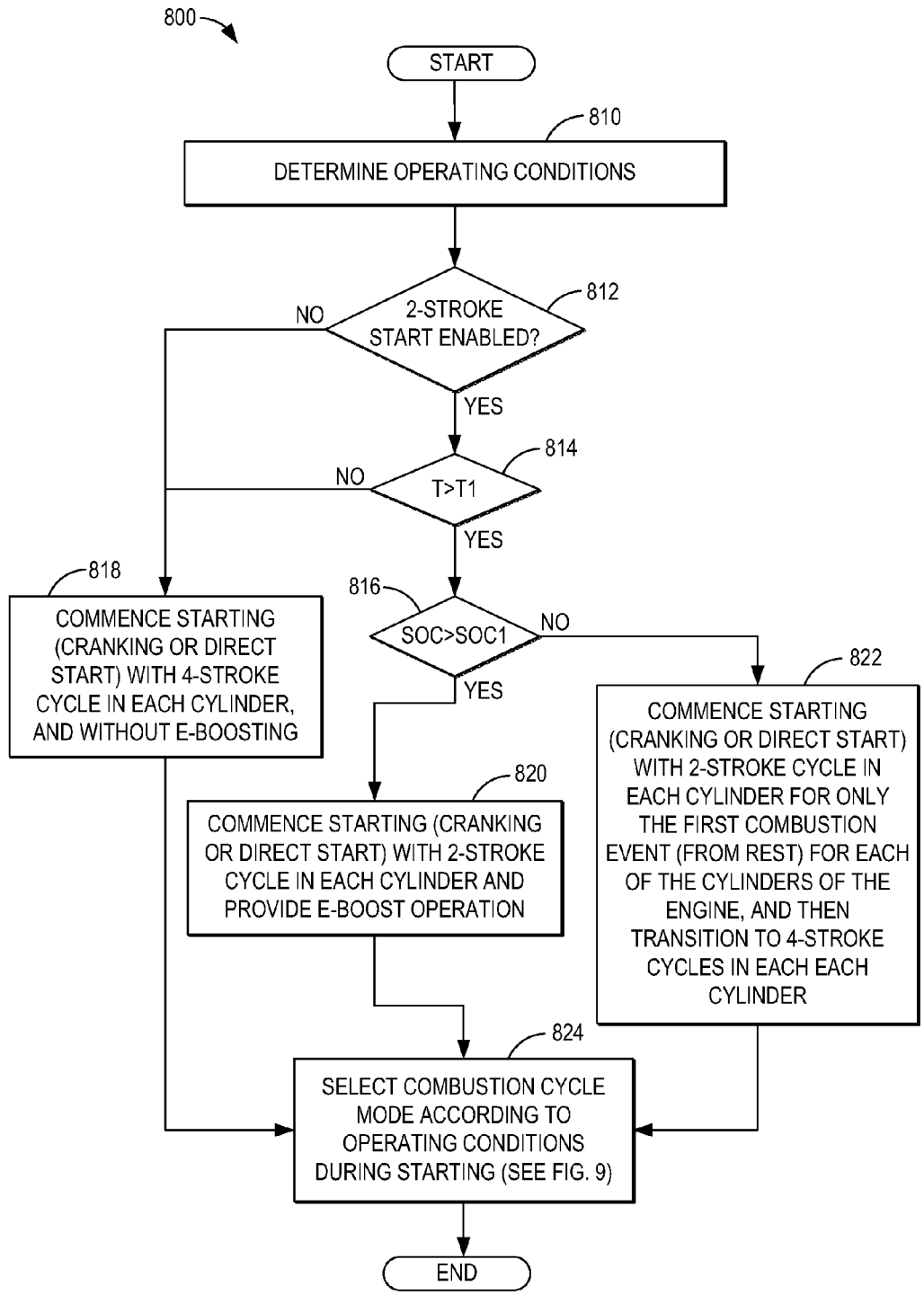
Figure 9:
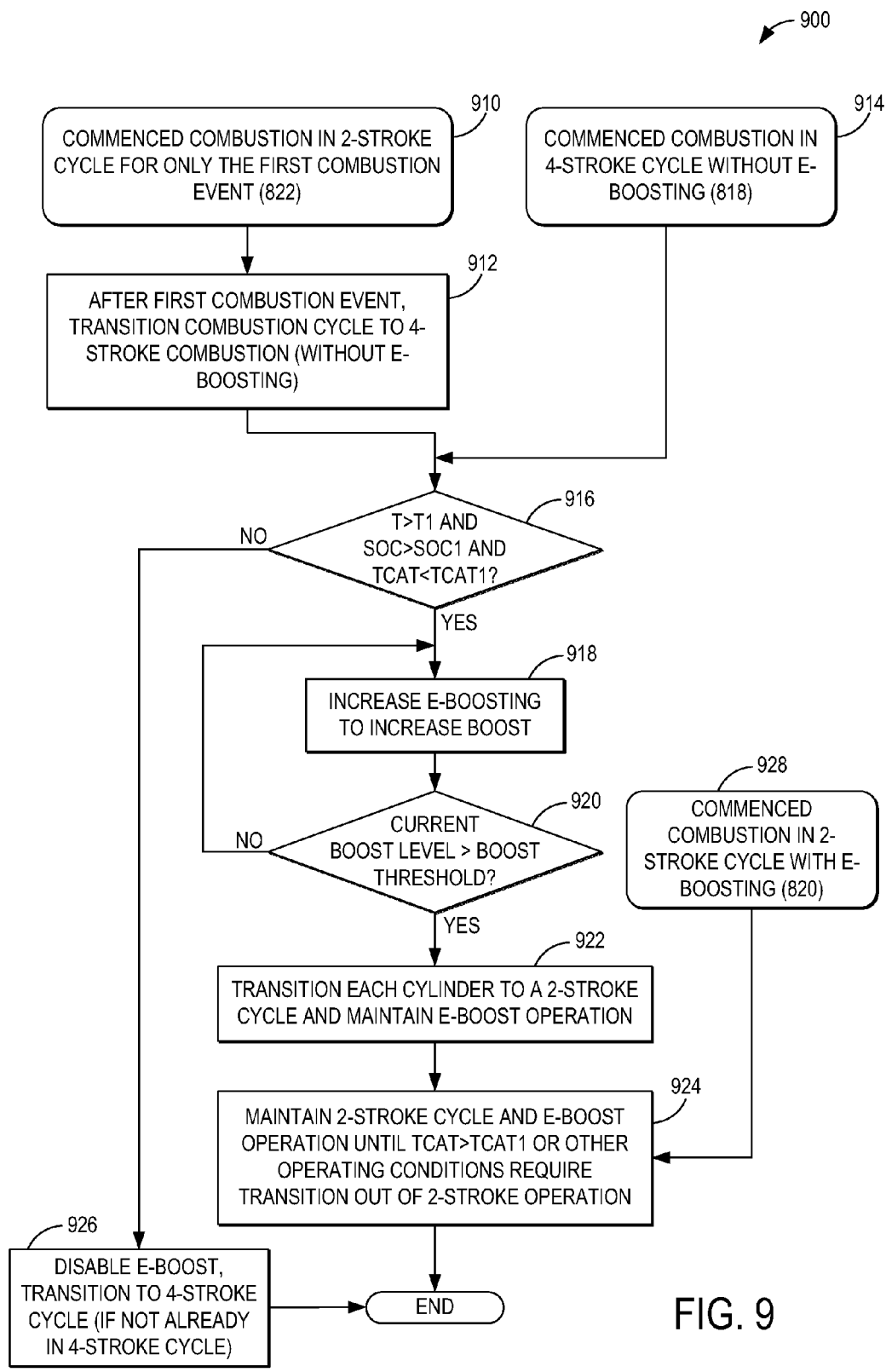

The following description relates to systems and methods for controlling an engine operating with various operating modes having a varying number of stokes per combustion cycle of the engine, and transitioning among the operating modes. As shown in FIGS. 5-6, an engine control system may include engine starting operation as well as idle-stop/restart operation. Further, as shown in FIGS. 7-9, a control system may be configured to select between a two-stroke combustion cycle and a four-stroke combustion cycle mode of engine operation based on engine starting conditions, battery conditions, etc. Further, the control system may also provide e-boosting operation to extend operation of the two-stroke mode, as well as to facilitate transitions into the two-stroke mode. The control system may also utilize two-stroke combustion for a first combustion event of the engine from rest, with or without boosting, such as e-boosting, in order to provide a faster engine re-start from idle-stop conditions.

Figure 1:
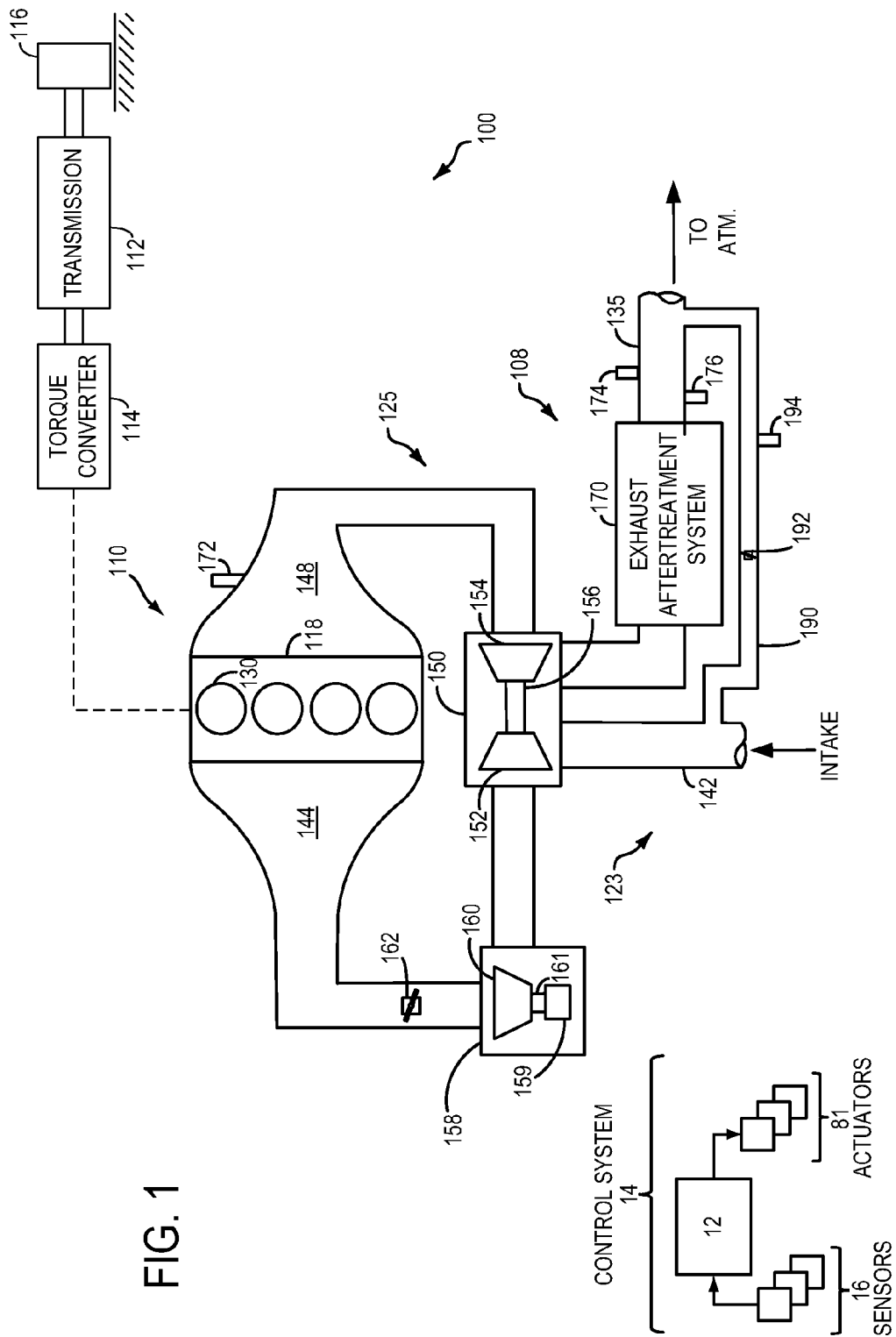
FIG. 1 shows an example vehicle system drive-train including an engine configured with an electrically powered boost (e-boost).

FIG. 1 shows a schematic depiction of a powertrain 100 of a vehicle (not shown). The powertrain 100 includes an engine system 110 coupled to an exhaust after-treatment system 108. The engine 118 may be coupled to an input of a transmission 112 through a torque converter 114. The transmission has an output coupled to a vehicle wheel 116. Transmission 112 may be a multi-ratio transmission having a plurality of selectable gear ratios. Transmission 112 may be an automatic or manual transmission, and in the case of a manual transmission, is coupled directly to the engine without a torque converter.

The engine system 110 may include an engine 118 having a plurality of cylinders 130. Engine 118 includes an engine intake 123 and an engine exhaust 125. Engine intake 123 includes a throttle 162 fluidly coupled to the engine intake manifold 144 via an intake passage 142. The engine exhaust 125 includes an exhaust manifold 148 eventually leading to an exhaust passage 135 that routes exhaust gas to the atmosphere. Throttle 162 may be located in intake passage 142 downstream of a boosting device, such as turbocharger 150, or a supercharger. Turbocharger 150 may include a first compressor 152, arranged between intake passage 142 and intake manifold 144. Compressor 152 may be at least partially powered by exhaust turbine 154, arranged between exhaust manifold 148 and exhaust passage 135. Compressor 152 may be coupled to exhaust turbine 154 via shaft 156.

Additionally, an electronic boost device 158 may be included in the intake, between the throttle 162 and the first compressor 152 of the turbocharger 150. Electronic boost device 158 includes a second compressor 160, which may be tuned to have its highest efficiency at a speed lower than the first compressor 152. Further, second compressor 160 may have a larger diameter than the first compressor 152. Second compressor 160 is shown coupled to a motor 159 via shaft 161. In one example, the electric motor 159 may be operated by the control system (discussed below) with stored electrical energy from a system battery (not shown) when the battery state of charge is above a charge threshold. By using electric motor 159 to operate electronic boost device 158, for example at engine start, an electric boost (e-boost) may be provided to the intake aircharge. In this way, the electric motor may provide a motor-assist to operate the boosting device to enable selected modes of operation even during the start, such as two-stroke combustion cycles for one or more (or all) of the cylinders of the engine.

However, other suitable configurations of boosting systems that incorporate an electric motor may also be possible. In some such configurations, the electronic boost device 158 may be arranged in parallel with the turbocharger 150 (as opposed to the series configuration depicted, for example, in FIG. 1). In further such configurations, a motor, such as motor 159, maybe coupled directly to the shaft 156 to at least partially operate turbocharger 150, for example at engine start. The motor-assist provided by the electric motor may be adjusted responsive to the operation of the engine and exhaust turbine. Further still, configurations including such motor-assisted turbochargers may omit electronic boost device 158.

Engine exhaust 125 may be include an exhaust after-treatment system 170 along exhaust passage 135. Exhaust after-treatment system 170 may include one or more emission control devices, some of which may be mounted in a close-coupled position in the exhaust passage. One or more emission control devices may include a three-way catalyst, lean NOx filter, SCR catalyst, etc. Exhaust after-treatment system 170 may also include hydrocarbon retaining devices, particulate matter retaining devices, and other suitable exhaust after-treatment devices (not shown). It will be appreciated that other components may be included in the engine such as a variety of valves and sensors, as further elaborated in the example engine of FIG. 2.

Further, in the disclosed embodiments, an exhaust gas recirculation (EGR) system may route a desired portion of exhaust gas from exhaust passage 135 to intake passage 142 via EGR passage 190. The EGR system may include a cooler in some embodiments. Further examples include a high pressure (HP) EGR passage (not shown) from exhaust manifold 148 to intake manifold 144. The amount of EGR provided to intake passage 142 may be varied by controller 12 via EGR valve 192. Further, an EGR sensor 194 may be arranged within the EGR passage and may provide an indication of one or more pressure, temperature, and concentration of the exhaust gas. Under some conditions, the EGR system may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

The vehicle may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas oxygen sensor 172 (located in exhaust manifold 48), temperature sensor 174, and exhaust gas sensor 176 (located downstream of emission control devices of 170). Other sensors such as pressure, temperature, air/fuel ratio, and composition sensors may be coupled to various locations in the vehicle, such as in the transmission, etc. As another example, the actuators may include fuel injectors (see FIG. 2), a variety of valves, motor 159, and throttle 162. The control system 14 may include a controller 12. The controller 12 may receive input data from the various sensors, process the input data, and trigger the actuators in response to the processed input data, based on instruction or code programmed therein, corresponding to one or more routines. Example control routines that are carried out in control system 14 are described herein with reference to FIGS. 5-9.

Figure 2:
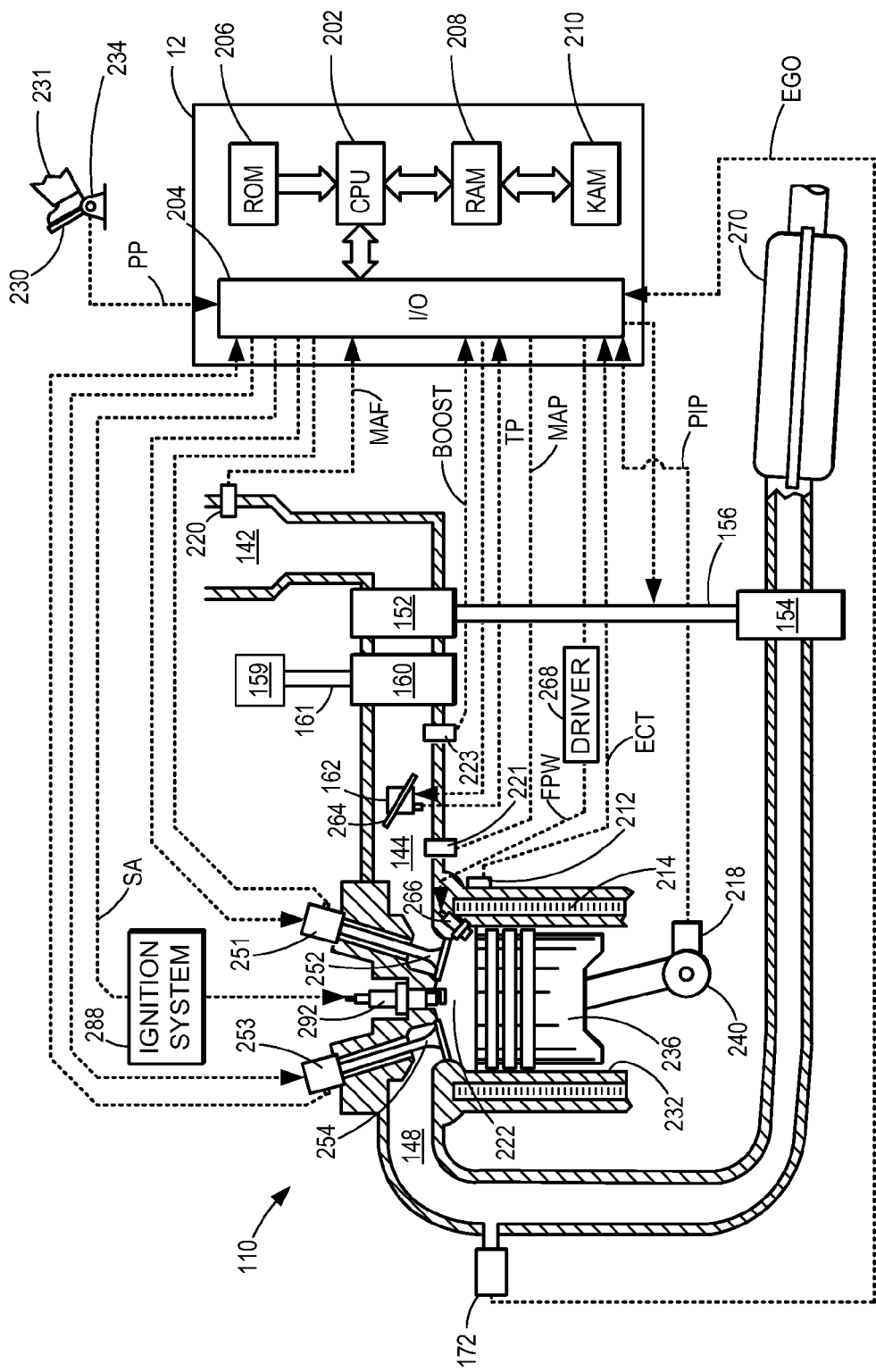
FIG. 2 shows a schematic depiction of an example engine.

FIG. 2 depicts an example embodiment of one combustion chamber or cylinder 222 of internal combustion engine 110, with similar parts labeled accordingly. Cylinder 222 may be at least partially defined by combustion chamber walls 232 and piston 236. Piston 236 may be configured to reciprocate within cylinder 222 and may be coupled to crankshaft 240 via a crank arm. Other cylinders (not depicted) of engine 110 may also include respective pistons that are also coupled to crankshaft 240 via their respective crank arms.

Cylinder 222 can receive intake air via intake air passage 142, and intake manifold 144. Intake manifold 144 can communicate with other cylinders of engine 110 in addition to cylinder 222. In some embodiments, one or more of the intake passages may include a boosting device such as a turbocharger or a supercharger, as noted above. For example, FIG. 2 shows engine 110 configured with a turbocharger including first compressor 152 arranged along intake passage 142, an exhaust turbine 154 arranged along exhaust passage 148, and an electronic boost device comprising a motor 159 driving a second compressor 160 via a shaft 161. First compressor 152 may be at least partially powered by exhaust turbine 154 via a shaft 156 where the boosting device is configured as a turbocharger. However, in other examples, such as where engine 110 is provided with a supercharger, exhaust turbine 154 may be optionally omitted.

Exhaust manifold 148 can receive exhaust gases from other cylinders of engine 110 in addition to cylinder 222. Exhaust passage 148 may include one or more exhaust after-treatment devices indicated generally at 270. For example, exhaust after-treatment device 270 may include a suitable exhaust catalyst, filter, or trap. Throttle 162 including a throttle plate 264 may be provided along an intake passage of the engine for varying the flow rate and/or pressure of intake air provided to the engine cylinders. For example, throttle 162 may be disposed downstream of both first compressor 152 and second compressor 160 as shown in FIG. 2, or may alternatively be provided upstream of first compressor 152 or disposed between compressors 152 and 160.

Each cylinder of engine 110 may include one or more intake valves and one or more exhaust valves. For example, cylinder 222 is shown including at least one intake poppet valve 252 and at least one exhaust poppet valve 254 located at an upper region of cylinder 222. In some embodiments, each cylinder of engine 110, including cylinder 222, may include at least two intake poppet valves and at least two exhaust poppet valves located at an upper region of the cylinder. As described herein, the engine can induct air past the intake poppet valves during rotation, such as during a start, to charge the cylinder with fresh air for combustion.

These intake valves and exhaust valves may be opened and closed by a suitable actuator, including electromagnetic valve actuators (EVA) and cam-follower based actuators, among others. For example, the position of intake poppet valve 252 may be adjusted by an intake valve actuator 251 and the position of exhaust poppet valve 254 may be adjusted by an exhaust valve actuator 253, where the actuators enable the cylinder and valves to operate in either a 2-stroke combustion cycle or a 4-stroke combustion cycle. In other embodiments, the intake and exhaust valves may be controlled by a common valve actuator or actuation system.

In some embodiments, each cylinder of engine 110 may include a spark plug 292 for initiating combustion. However, in some embodiments, spark plug 292 may be omitted, such as where engine 110 may initiate combustion by auto-ignition or by injection of fuel as may be the case with some diesel engines. Further, each cylinder of engine 110 may be configured with one or more fuel injectors for providing fuel thereto. As a non-limiting example, cylinder 222 is shown including a fuel injector 266 that is configured as a direct fuel injector for injecting fuel directly into cylinder 222. However, in other examples, fuel injector 266 may be configured as a port fuel injector and may be arranged, for example, along intake manifold 144, where fuel injected by the port fuel injector may be entrained into the cylinder via intake poppet valve 252.

As noted above, the control system may comprise one or more electronic controllers, such as controller 12. FIG. 2 depicts an example embodiment including at least one processor (CPU) 202 and memory such as one or more of read-only memory ROM 206, random-access memory RAM 208, and keep-alive memory (KAM) 210, which comprise computer-readable media that may be operatively coupled to the processor. Thus, one or more of ROM 206, RAM 208, and KAM 210 can include system instructions that, when executed by the processor performs one or more of the operations described herein, such as the process flow of subsequent the figures. Processor 202 can receive one or more input signals from various sensory components and can output one or more control signals to the various control components described herein via input/output (I/O) interface 204. In some examples, one or more of the various components of controller 12 can communicate via a data bus.

Controller 12 may be configured to receive an indication of operating conditions associated with engine 110 among the other components of previously described system 100. For example, controller 12 can receive operating condition information from various sensors, including: an indication of mass air flow (MAF) from mass air flow sensor 220; an indication of intake or manifold air pressure (MAP) from pressure sensor 221, an indication of boost from sensor 223, an indication of throttle position (TP) from throttle 162, an indication of engine coolant temperature (ECT) from temperature sensor 212 coupled to cooling sleeve 214, and an indication of engine speed from a profile ignition pickup signal (PIP) via Hall effect sensor 218 (or other suitable engine speed sensor) coupled with crankshaft 240. Further still, user input may be received by the control system from a vehicle operator 231 via an accelerator pedal 230 operatively coupled with a pedal position sensor 234, thereby providing an indication of pedal position (PP). The pedal position can provide the control system with an indication a desired engine/vehicle output by the vehicle operator.

The control system can also receive an indication of exhaust gas composition (EGO) from exhaust gas sensor 172. As a non-limiting example, exhaust gas sensor 172 may include an exhaust gas oxygen sensor for detecting an elemental oxygen component of the exhaust gases or exhaust gas mixture produced by the engine, among other suitable exhaust gas sensors. The control system may be further configured to utilize feedback from exhaust gas sensor 172 to identify or infer a resulting composition of a mixture of air and fuel delivered to the engine during previous combustion events, and may enable the control system to adjust one or more of the air quantity, fuel quantity, and valve timing in response to this feedback to obtain a target cylinder charge and exhaust gas composition.

Controller 12 may also be configured to respond to the various indications of operating conditions that are received from the various sensors by adjusting one or more operating parameters of the engine. As one example, the control system may be configured to increase or decrease the engine output (e.g. engine torque and/or engine speed) in response to an indication of pedal position received from pedal position sensor 234. The control system may be configured to vary the amount of fuel delivered to the engine via fuel injector 266 by adjusting a fuel injector pulse-width via driver 268, thereby varying the composition of an air and fuel mixture combusted at the engine. The control system may vary the spark timing provided to each cylinder via ignition system 288. The control system may vary the valve timing of the intake and exhaust poppet valves via valve actuators 251 and 253, respectively, which may include variable cam timing actuators. The control system may adjust the level of boosted intake air provided to the engine by adjusting an operating parameter of the boosting device, for example, via a wastegate (not shown). Further still, the control system may adjust throttle position via electronic throttle control. These and other actions carried out by the control system, such as via controller 12, are described below herein with regard to FIGS. 5-9.

Figure 3:
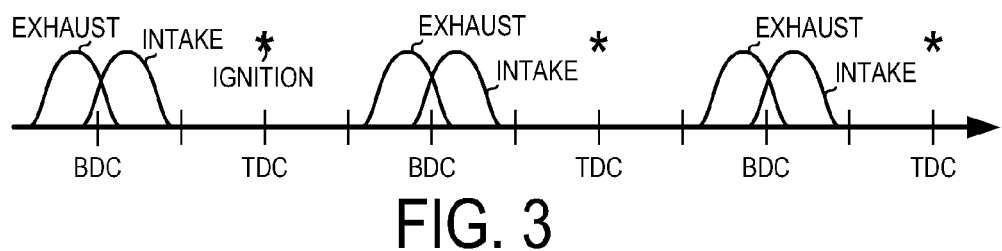
FIGS. 3-4 show example engine cylinder timing diagrams.
Figure 4:
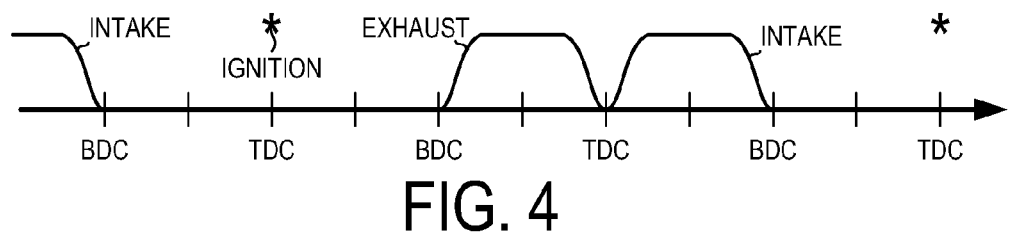

Referring now to FIGS. 3-4, graphs illustrate example operation according to 2-stroke and 4-stroke combustion cycles for a cylinder of the engine 110. Specifically, the figures show timing diagrams for an example cylinder operating in a two-stroke cycle and a four-stroke cycle, respectively. An indication of crank angle is provided along the horizontal axes with reference to piston position. Top dead center (TDC) and bottom dead center (BDC) represent the piston position relative to the cylinder as it reciprocates throughout operation of the engine. A comparison of FIGS. 3 and 4 illustrates how the intake and exhaust valves of the cylinder may be opened twice as often in the two stroke cycle as the four stroke cycle. Further, fuel may be delivered to the engine at twice the frequency during the two stroke cycle as the during the four stroke cycle. For example, the cylinder may be fueled approximately every 360 crank angle degrees during the two stroke cycle and approximately every 720 degrees during the four stroke cycle. Further still, ignition of the air and fuel charge within the cylinder may be performed around each TDC (e.g. approximately every 360 crank angle degrees) in the two stroke cycle, and may be performed around every other TDC in the four stroke cycle (e.g. approximately every 720 crank angle degrees).

Thus, in four-stroke operation a complete combustion cycle is completed in four strokes of the piston and two revolutions of the crankshaft, and with two-stroke operation, a complete combustion cycle is completed in two strokes of the piston and one revolution of the crankshaft. In comparison to four-stroke engines, two-stroke engines may have, in some conditions, the advantage of engine air throughput for the same crankshaft speed and higher torques, especially at low engine speeds. However, they may also experience degraded combustion stability and emissions under some conditions.

As noted herein, different cylinder combustion cycles may be used for different operating conditions, and the engine control system may transition the cylinder combustion cycle mode responsive to various operating conditions, where transitions from four-stroke to two-stroke operation may be based on different criteria than transitions from two-stroke to four-stroke operation in response to various operating conditions, such as engine speed, driver requested output, etc. Various other factors may additionally or alternatively be used in initiating a transition to a lesser number of strokes (e.g., two-stroke operation), the factors related to limits on the ability of the engine to provide desired power in the higher number of stroke operation (e.g., four-stroke). The physical limits that may limit operation as the amount if air and fuel charge increase in the cylinder include: cylinder peak pressure, cylinder/exhaust/catalyst peak temperature, knock limit, and noise/vibration/harshness (NVH) limit (e.g., due to combustion-generated pressure rate of rise). Transitions from four-stroke to two-stroke operation enables increased engine output (or decrease engine displacement for fuel economy at the same performance level) further than available by boosting alone. Thus, by transitioning in response to reaching one of the above limits, two-stroke operation can be used to continue power generation at the desired operating condition while reducing the constraining limit.

In one example, a method is described that transitions a cylinder of the engine from operating with a first number of strokes per combustion cycle (e.g., four-stroke) to a second, lesser, number of strokes per combustion cycle (e.g., two-stroke) in response to boost pressure rising above a threshold boost value, along with other the above factors, if desired. For example, if a transition to two-stroke operation is requested to increase engine power at current engine speed, or if the transition is requested due to knock-generated spark retard, such a transition can be enabled only if sufficient boost is present. The transition can either be delayed until boost is generated, or actions can be taken to increased boost. For example, boost may be generated by operation of motor 159 if sufficient exhaust flow is not currently present (assuming sufficient battery state of charge is available). In this way, operation in two-stroke mode can be efficiently carried out as boost pressure is already present to provide the desired clearing of residuals from the combustion chamber. Further, the boost level, along with other parameters such as throttle angle, spark timing, etc., may be used as a control parameter and adjusted during the transition to smooth engine output. A single sufficient boost (e.g., threshold) level may be set for a range of operating conditions, or the boost threshold may be adjusted based on operating conditions such as engine airflow, where the threshold increases for increasing airflow.

Transitions from a lesser number of combustion cycles to a greater number of combustion cycles (e.g., from two-stroke to four-stroke operation) may be carried out responsive to at least some different criteria than the opposite transition. In one example, rather than consider the physical limits, the transition may be scheduled based on speed and desired engine output (e.g., torque), irrespective of peak pressure, exhaust temperature, etc.

As also noted herein, different cylinder combustion cycles may be used for starting the engine, where the selection of the cylinder combustion cycle operation is responsive to various engine starting conditions, as well as responsive to how the engine shuts down. Further, such starting strategies may take advantage of electrically powered boost (e.g., via motor 159) which can provide boost even before the engine combusts. In one example, a starting method utilizes an intake compression devices, such as second compressor 160, driven by an electric machine, such as 159, where the method includes generating boost in the intake by driving the compressor with at least the electric machine during engine starting; and commencing combustion in the cylinder from a non-combusting condition, the combustion in a two-stroke combustion cycle. The combustion may be the first combustion event of the start. Such operation can be used for improved direct starting (where combustion occurs before or with initial rotation of the engine, or starter-based (or starter-assisted) cranking operation, where the first combustion occurs when the engine is rotating at a selected engine speed. Further, such operation can be particularly advantageously applied during engine re-start operation from an idle-stop condition since the engine is already sufficiently warmed, provided sufficient battery state of charge is available. Specifically, a faster engine restart may be achieved thus providing the operator a more responsive vehicle launch.

Various approaches may be used for starting the engine with two-stroke combustion cycles via electrically generated boost, where two-stroke operation may be maintained for a plurality of combustion events for each engine cylinder, or each cylinder may execute only a single two-stroke combustion cycle, and then transition to four-stroke cycles. Such operation may be used where the electric machine takes some time to generate sufficient boost to enable two-stroke operation. However, as specified, the first combustion cycle following non-combusting may still utilize a two-stroke combustion cycle since the cylinder contents can be assumed to be substantially fresh air installed in the cylinders during the shutdown operation.

Referring now to FIG. 5, a routine 500 is described for controlling operation of engine 110. The routine first determines at 510 whether vehicle starting operation is present, such as a vehicle start from non-warmed up conditions, which may include a cold engine start conditions. The cold engine start condition may be determined responsive to engine coolant temperature and/or catalyst temperature being approximate at ambient temperatures, for example. If it is not a vehicle starting condition, the routine continues to 512 to execute the engine idle-stop/re-start routine, described in further detail with regard to FIG. 6. The engine idle-stop/re-start routine carries out idle stop/start operation, during warmed up vehicle operating conditions, to improve fuel economy. For example, during stopped vehicle conditions (e.g., non-moving vehicle conditions), the engine may be shut-down to reduce fuel spent to maintain idle operation. Then, in response to operating conditions (e.g., a demand for engine operation to maintain battery state of charge) or an operator drive request (e.g., operator releases a brake pedal and/or depresses an accelerator pedal), the engine is automatically re-started. Still further details are provided with regard to FIG. 6.

Next, at 516, the routine carries out a combustion cycle mode selection routine that selects a combustion cycle mode for engine operation. For example, when the engine is operating, the routine selects whether the engine operates with 2-stroke or 4-stroke combustion cycles. Further, the routine carries out various other control actions as described further with regard to FIG. 7.

When the answer to 510 is YES, the routine continues to 514 to carry out a starting routine for starting the vehicle and/or engine from non-warmed conditions, which can also include a combustion mode selection for the starting condition, as described further with regard to FIGS. 8-9. In one example, the routine performs engine starting with a first combustion cycle including either a 2-stroke combustion cycle or a 4-stroke combustion cycle depending on operating conditions, and further controls e-boosting operation to coordinate with the combustion cycle operation.

Referring now to FIG. 6, a more detailed description of the engine idle-stop/re-start operation for the systems of FIG. 1-2 is provided. The engine control system may be configured to automatically shut down engine operation responsive to operating conditions (e.g., idle-stop conditions) and without receiving, and thus independent from, an engine shutdown request from the vehicle operator. The conditions may include information pertaining to a battery state of charge, cabin cooling, air conditioner compressor status, brake pressure, oil pressure, engine temperature, battery temperature, engine coolant temperature, brake sensor status, vehicle speed, engine speed, input shaft rotation number, and throttle opening degree. In contrast, an engine shutdown request from the operator may include, for example, a key-off condition or an actuation of an engine shutdown button. Likewise, the engine control system may be configured to automatically re-start the engine from idle-stop conditions in response to various operating conditions and/or in response to vehicle operator input, such as release of a brake pedal.

Turning now to the details of FIG. 6, at 602, it is confirmed whether conditions 603 for an idle-stop have been met. Any or all of the conditions 603 pertaining to an idle-stop, as further described herein, may be met for an idle-stop condition to be confirmed. For example, at 604, the engine status may be determined. Herein it may be verified that the engine is currently in operation (e.g., is carrying out combustion). At 606, the battery state of charge (SOC) may be determined. In one example, if the battery SOC is more than 30%, it may be determined that an engine idle-stop may be possible. At 608, it may be verified that the desired vehicle running speed is below a threshold. In one example, the desired speed may be substantially stopped (zero). At 610, an air-conditioner status may be assessed and it may be verified that the air conditioner has not issued a request for restarting the engine, as may be requested if air conditioning or cabin cooling is desired where a compressor of the air conditioning system is coupled to the engine crankshaft, for example. At 612, the engine temperature may be estimated and/or measured to determine if it is within a selected temperature range. In one example, the engine temperature may be inferred from an engine coolant temperature and an engine idle-stop condition may be selected when the engine coolant temperature is above a predetermined threshold. At 614, a throttle opening degree may be determined using a throttle opening degree sensor. In one example, the sensor reading may be used to confirm that a throttle operation has not been requested by the vehicle operator. At 616, the operator requested torque may be estimated to confirm that it is less than a predetermined threshold value. At 618, a brake sensor status may be read, where idle stop conditions are determined when the brakes are depressed by the vehicle operator. At 620, the engine speed may be determined to confirm that it is less than a predetermined threshold value. At 622, the input shaft rotation number (Ni) may be determined. Other idle-stop criteria may include an air conditioner compressor status, brake pressure, oil pressure, and battery temperature, as examples.

If any or all of the idle-stop conditions are met at 602, then at 626, the controller may initiate execution of the idle-stop operation and proceed to deactivate the engine in an effort to provide fuel savings and emission benefits. In one particular example, a shutdown is initiated only if each and every condition is satisfied. The engine shutdown may include shutting off fuel and/or spark to the engine. If idle-stop conditions are not met at 602, then at 624, the engine status may be maintained until either restart conditions are met and/or until the operator requests a vehicle launch.

At 628, it is determined whether conditions 603 for an engine restart have been met. Conditions 603 may again be determined in assessing whether to re-start the engine, as further described herein. For example, at 604, the engine status may be determined. The routine may verify that the engine is currently in idle-stop status (e.g., not carrying out combustion). At 606, the battery state of charge (SOC) may be determined. In one example, if the battery SOC is less than 30%, it may be determined that an engine restart may be initiated. At 610, an air-conditioner status may be assessed and it may be verified whether the air conditioner has issued a request for restarting the engine, as may be requested if air conditioning or cabin cooling is desired. At 612, the engine temperature may be estimated and/or measured to determine if it is within a selected temperature range, e.g., above a threshold value. In one example, the engine temperature may be inferred from an engine coolant temperature and an engine restart condition may be selected when the engine coolant temperature is below a predetermined threshold. At 614, a throttle opening degree may be determined using a throttle opening degree sensor. In one example, the sensor reading may be used to detect whether a start has been requested by the vehicle operator (e.g., if the throttle is depressed greater than a threshold value). At 616, the operator requested torque may be estimated to indicate that it is more than a predetermined threshold value. At 618, a brake sensor status may be read. In one example, release of a brake pedal may identify an engine re-start condition. Other restart criteria may include an air conditioner compressor status, brake pressure, oil pressure, and battery temperature.

If at least one restart conditions is met, then at 630, an engine restart may be executed and the vehicle may be launched, if desired. In one example, the engine re-start operation described in FIGS. 8-9 may be carried out for starting the engine in different cylinder stroke modes based on operating conditions as described. Otherwise, 628, the routine may end.

Referring now to FIG. 7, a routine is described for selecting a cylinder combustion cycle mode of engine 110. First, at 710, the routine determines whether an engine starting condition is present. The engine start may include various stages of operation, including initial combustion from rest, engine cranking, and run-up of engine speed to idle. If the engine is starting, the routine continues to 712 and carries out the routines of FIGS. 8-9, as noted in FIG. 6, to select the combustion cycle mode according to starting conditions. Otherwise, the routine continues to 714 to determine the current combustion cycle mode (e.g., two-stroke or four-stroke). Further, the routine determines the mode transition criteria for non-starting conditions based on the current mode and current operating conditions. As noted herein, different criteria may be used for transitions to/from different modes. Next, in 718, the routine determines whether transition criteria are met.

For example, when in four-stroke operation, the routine may determine whether knock-induced spark retard is greater than a threshold value (indicating knock-limiting performance in four-stroke operation at the current operating conditions). In another example, when in four-stroke operation, the routine may determine whether peak cylinder pressure is above a peak threshold value, and if so, request a transition to two-stroke operation. In yet another example, when in two-stroke operation, the routine may determine whether engine torque requested for a given engine speed is above a transition threshold, and if so, request a transition to four-stroke operation. Further, a speed/torque map may be used to request transitions from two-stroke to four-stroke operation. Further still, the various factors and other conditions noted elsewhere herein may be used, if desired.

If transition criteria are met, the routine continues to 720 to determine if the transition is from four-stroke to two-stroke operation. If so, the routine continues to 728 to perform the transition, and carry out transition compensation as described further in FIG. 9. Otherwise, the routine continues to 722 to determine whether the boost level is above a boost threshold value, where the boost threshold may be selected based on operating conditions to be a sufficient boost to enable two-stroke combustion cycles. As noted herein, in one example, the boost threshold may be increased with increasing airflow through the engine, to ensure that sufficient boost is available to clear residuals from the cylinder during intake/exhaust valve overlap conditions. When sufficient boost is present, the routine continues to 728 to carry out the transition to two-stroke operation.

If sufficient boost is not present, the routine continues to 724 to determine whether boost adjustment is enabled. Such a determination may be based on a battery state of charge being above a threshold where motor 159 is used to power second compressor 160 and/or supplement turbine 154 and drive first compressor 152. Further, it may be based on a turbine speed being above a threshold where adjustment of the wastegate is used to increase boost. If such adjustment is enabled, at 726, the boost is increased (e.g., via motor 159, a wastegate, combinations thereof, etc.). If the answer to 724 is NO, the routine continues to 733 to maintain the current combustion cycle mode until sufficient boost is generated or otherwise available. In this way it is possible to delay a transition to two-stroke operation until sufficient boost is generated. Further, in this way, it is possible to take advantage of motor 159 to enable operation in the two-stroke mode even when the turbine is unable to generate sufficient boost, thus expanding the window of two-stroke operation.

Referring now to FIGS. 8-9, routines are described for controlling engine starting operation, either during engine re-start operation or during an operator-initiated engine cold start (e.g., a start from non-warmed up conditions where the engine is substantially at ambient conditions). First, in 810, the routine determines operating conditions, such as ambient conditions, engine temperature, engine running/shutdown state, etc. Then, at 812, the routine determines whether a two-stroke combustion cycle mode is enabled during the start (for example during idle-stop/start). This determination may be based on whether the start is an engine re-start with the engine already warmed-up (e.g., based on engine coolant temperature being greater than a threshold value and based on the engine being in an idle-stop shutdown state, two-stoke combustion may be enabled). If so, the routine continues to 814 to determine whether an engine temperature (T), such as ECT, is greater than a threshold (T1), e.g., approximately 150 degrees F. If so, the routine continues to 816 to determine whether the state of charge of the battery (SOC) is greater than a threshold charge level (SOC1) sufficient to enable assistance to the second compressor 160 via the motor 159. If so, the routine continues to 820 to commence engine starting (e.g., with engine starter assisted cranking and/or direct start) with each cylinder operating in a two-stroke combustion cycle and with electrically-assisted boosting (e-boost) operation.

Otherwise, when the answer to 816 is NO, the routine continues to 822 to commence starting (via starter cranking and/or direct start) with two-stroke combustion cycles in each cylinder for only the first combustion event (without e-boosting in one example), and then transitioning to four-stroke operation. For example, even if the SOC is insufficient to enable e-boosting operation to assist in extending two-stroke operation during the engine start, the engine may still carry out at least one combustion event in each cylinder (the first event from rest) in two-stroke operation to enable faster engine run-up, and then the engine can transition to four-stroke operation to address the lack of sufficient boost.

In one particular example, the routine includes, during engine starting, generating boost in the intake by driving the second compressor with at least the electric machine during engine starting, commencing combustion in each of the plurality of cylinders from a non-combusting condition, the combustion in a two-stroke combustion cycle of the cylinder, each cylinder performing exactly one combustion event in the two-stroke combustion cycle, transitioning each cylinder to a four-stroke combustion cycle for a next combustion event following the exactly one combustion event, and maintaining combustion in each cylinder in the four-stroke combustion cycle until boost pressure rises above a threshold during the engine start, and then returning each cylinder to the two-stroke combustion cycle. The non-combusting condition may include non-rotating engine operation, as well as cranking operation (where the starter rotates the engine before the first combustion event from rest).

Further, after returning each cylinder to the two-stroke combustion cycle, the engine is operating in idle conditions and each cylinder may continue in the two-stroke combustion cycle until catalyst temperature reaches a light-off threshold, and then each cylinder is transitioned to the four-stroke combustion cycle, as further described with respect to the routine of FIG. 9. Such an operation of the engine may provide various advantages. An engine operating with a two-stroke combustion cycle may have a greater rate of air flow through the engine, at a given engine speed, than if the engine was operated with a four-stroke combustion cycle. During idle operations, engine speed may be limited. For example, noise vibration and harshness (NVH) constraints as well as unintentional engagement of a torque converter (e.g., torque converter 114) resulting in increased creep torque may suggest an engine speed threshold, under which it is desirable to maintain engine speed during idle. However, during catalyst warm up, increased exhaust air flow may be desired to increase heat transferred to the catalyst. Therefore, it is possible that by operating the engine with a two-stroke engine cycle, a catalyst in an example exhaust aftertreatment system receives more heat due to increased exhaust air flow while engine speed is maintained below the engine speed threshold determined by NVH and torque converter engagement constraints.

When the answer to either 812 or 814 is NO, the routine continues to 818 to commence starting (via starter cranking and/or direct start) with four-stroke combustion cycles in each cylinder and without e-boosting operation.

Then, from either 818, 820, or 822, the routine continues to 824, where the control system carries out the selected operation, with additional details described with regard to FIG. 9. Further, various adjustments to operating parameters may be made based on the selection, including fuel injection adjustments. For example, the routine may include adjusting a fuel injection amount based on whether or not the electric machine operation is provided, as well as the amount of e-boosting assistance. The fuel injection adjustment may be provided during various stages of starting, such as during the cranking operation where increased fuel injection is provided when electrically assisted boosting is provided to account for air charge effects of the boosting, taking into account valve timing, engine speed, and other operating conditions. Likewise, spark timing may be adjusted based on whether the e-boosting operation, and the extent of e-boosting assistance. For example, with increased e-boosting assistance during starting, a greater cylinder charge may be provided thus enabling further spark retard as compared with less e-boosted, or non-e-boosted, conditions.

The commencing of combustion in any of 818, 820, and 822 may include sequential combustion from the first combustion event, where each cylinder of the engine carries out combustion in a sequential firing order, where the firing order refers to the sequence of cylinders carrying out combustion. Further, in the example of 822, each cylinder of the engine commences combustion in the two-stroke combustion cycle in a sequential firing order, and then each cylinder is transitioned to four stroke per cycle combustion operation in the sequential firing order.

Note that the driving of the second compressor at least partially by the motor 159 may be carried out during engine cranking and possibly before a first combustion event in a cylinder of the engine including the first combustion event from a non-combusting rest condition of an idle-stop shutdown condition. For example, when the engine is shut down at vehicle stopped conditions to increase fuel economy, the shut-down duration may be sufficiently short relative to engine cool down to enable restart with a warmed-up engine and emission control device.

In this way, it is possible to, for example, selectively restart an engine from idle-stop operation with two-stroke combustion utilizing electrically powered boosting. The operation with reduced number of stroke combustion enables a more rapid increase of engine speed from rest and/or cranking, thus providing a faster vehicle launch. Further, by considering battery state of charge, e-boosting operation may be limited to reduce overly draining battery charge needed for engine cranking, if applicable. Further, even if e-boosting is unavailable for a first combustion event or for sustained two-stroke combustion during cranking, run-up, etc., it is still possible to achieve an improved engine start time by recognizing that the first combustion event from rest is capable of two-stroke operation, even with insufficient boost, due to the filling of the cylinders with substantially fresh air during a previous engine shut down.

Referring now to FIG. 9, it sets forth additional details of the starting routine of FIG. 8. Specifically, at 910 when combustion is commenced according to 822, the routine continues to 912, where after the first combustion event, the routine transitions combustion cycle operation to four-stroke combust cycles without, or with reduced, electrical assistance to the second compressor from motor 159. As noted above, the routine may transition at 912 immediately following each cylinder carrying out a single combustion event in the two-stroke combustion mode. Note that when operating with sequential combustion, a transition for each cylinder occurs immediately following the completion of the first combustion event, and thus each cylinder transitions in sequence as well (and thus some cylinders may have transitioned while others are still completing their first combustion event).

From either 912, or 914 when combustion is commenced according to 818 in the four-stroke combustion cycle, the routine continues to 916 to determine whether catalyst temperature (TCAT) is below a threshold catalyst temperature (TCAT1), such as a light-off temperature, battery SOC is above the threshold SOC1, and engine temperature (T) is above threshold (T1). If so, the routine continues to 918 to start and/or increase e-boosting operation to increase the boost level of the engine intake manifold. At 920, the routine determines whether the boost level is above the boost threshold, and if not, returns to 918. If sufficient boost for transition to two-stroke operation is present, the routine continues to 922 to transition each cylinder to a two-stroke combustion cycle and maintain sufficient boost, such as through e-boosting, wastegate control, and/or combinations thereof. Further, in 924, two-stroke operation is maintained until catalyst temperature reaches the threshold catalyst temperature or other conditions request a transition to four-stroke operation (see FIG. 7, for example).

If the answer to 916 is no, the routine continues to 926 to disable e-boosting operation and transition to four-stroke combustion cycles (if not already in four-stroke operation). Further still, engine starting may commence at 928 (e.g., with engine starter assisted cranking and/or direct start) with each cylinder operating in a two-stroke combustion cycle and with electrically-assisted boosting (e-boost) operation (i.e., as described at 820), and continue on to maintained two-stroke operation at 924.

In this way, the engine may transition among the combustion cycle modes during engine starting operation to selectively utilize faster engine restarting ability of two-stroke operation, which can be enhanced with e-boosting operation. Further, catalyst temperature conditions may be considered in selecting the combustion mode to provide faster catalyst heating in selected situations.

Referring now to additional details of transition compensation carried out by controller 12 in transitioning modes, such as at 824, the compensation may include providing adjustment to operating parameter to accommodate transitions in the number of strokes in an engine combustion cycle, particularly taking advantage of electrically adjustable boosting operation. For example, increased boosting (e.g., via e-boosting operation) can be provided before the transition from four-stroke to two-stroke combustion cycles (pre-boosting).

Further, throttle and spark adjustments may be provided, including during pre-boosting where spark retard may be used to compensate for temporarily increased boost while still in the four-stroke combustion cycle mode. Further still the electric motor may be adjusted responsive to the transition from two-stroke to the four-stroke combustion to transiently adjust boost level during the transition thereby compensating, at least partially, for torque increases/decreases of changing the number of strokes in combustion cycles of the engine.

As such, in some example, the routine may increase boost in four-stroke combustion cycle operation above that needed for four-stroke operation (e.g., via e-boosting) to enable a transition to two-stroke operation with sufficient boost, where the motor drives the second compressor to increase compressor speed before the transition. Further, while increasing boost in four-stroke operation, the control system may further retard spark timing and/or increase throttling to compensate for the additional boost.

In still further examples, an amount of recirculated exhaust gas returned to the intake of the engine (often called external EGR gas) may or may not be varied by an EGR system (for example, as described above with reference to FIG. 1) in response to transient engine conditions and/or switching operation between two-stroke and four-stroke cycles. Such a change in the amount of recirculated exhaust gas may be the result of the change in engine operating conditions inherent in operating in a higher or lower number of strokes in an engine cycle. For example, an amount of exhaust gas retained within a cylinder each engine cycle (referred to as internal EGR gas) may be vary between two-stroke operation and during four-stroke operation. As a result, an amount of external EGR gas may be varied during and after switching between operation of two different engine cycles. In one particular example, the external EGR is decreased when transitioning from 4-stroke to 2-stroke operation to account for the increased internal EGR in 2-stroke as compared to 4-stroke operation for an example engine speed/load condition, or vice versa.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of starting an engine having cylinders and a compressor, coupled to an engine intake comprising:
   during engine re-start operation of an engine idle-stop condition, commencing two-stroke combustion in a cylinder from a non-combusting condition and driving the compression device by an electric machine to generate boost in the intake during engine cranking before a first combustion event in the cylinder.

2. The method of claim 1 wherein the first combustion event in the cylinder is a first combustion event from engine rest.

3. The method of claim 1 further comprising:
   performing a second combustion event in the cylinder immediately following the commencing combustion event, the second combustion event in the two-stroke combustion cycle when a boost level of the engine during the second event is greater than a threshold, where the boost level during the commencing combustion event was below the threshold.

4. The method of claim 2 wherein the non-combusting condition is a vehicle stopped and engine stopped condition, where the engine is automatically shut-down during stopped vehicle conditions independent from a vehicle operator shut-down request.

5. The method of claim 3 further comprising transitioning the cylinder to four-stroke per cycle combustion operation in response to operating conditions.

6. The method of claim 2 wherein the engine inducts air during the start from at least one poppet valve coupled to the cylinder.

7. The method of claim 5 further comprising adjusting the electric machine based on an engine temperature during the start and based on a battery state of charge.

8. The method of claim 6 wherein each cylinder of the engine commences combustion in the two-stroke combustion cycle in a sequential firing order, and then each cylinder is transitions to four stroke per cycle combustion operation in the sequential firing order.

9. The method of claim 2 further comprising adjusting a fuel injection amount based on the electric machine operation, where during engine cranking, fuel injection is adjusted responsive to operation of the electric machine.

10. The method of claim 2 further comprising adjusting a spark timing based on the electric machine operation.

11. A method of starting an engine of a vehicle, the engine having a plurality of cylinders and a compression device coupled to an intake of the engine, the compression device driven at least partially by an electric machine, the method comprising:
   generating boost in the intake by driving the compressor with at least the electric machine during engine starting before a first combustion event in each of the plurality of cylinders; and
   commencing combustion in each of the plurality of cylinders from a non-combusting condition, the combustion in a two-stroke combustion cycle of the cylinder, each cylinder performing exactly one combustion event in the two-stroke combustion cycle; and
   transitioning each cylinder to a four-stroke combustion cycle for a next combustion event following the exactly one combustion event;
   maintaining combustion in each cylinder in the four-stroke combustion cycle until boost pressure rises above a threshold during the engine start; and then
   returning each cylinder to the two-stroke combustion cycle.

12. The method of claim 10 wherein after returning each cylinder to the two-stroke combustion cycle, each cylinder continues in the two-stroke combustion cycle until catalyst temperature reaches a light-off threshold, and then each cylinder is transitioned to the four-stroke combustion cycle.

13. The method of claim 10 wherein the boost is generated for commencing combustion when a state of charge of a battery coupled to the electric machine is greater than a threshold charge level.

14. The method of claim 10 wherein the non-combusting condition includes engine cranking.

15. The method of claim 10 wherein the non-combusting condition includes the engine at rest.

16. The method of claim 10 further comprising shutting down the engine during and engine idle stop, wherein said commencing combustion and generating boost are responsive to release of an operator's foot from a brake pedal of the vehicle.

17. The method of claim 15 wherein the engine operates at idle when returning each cylinder to the two-stroke combustion cycle.

18. The method of claim 16 wherein the electric motor is adjusted responsive to the transition to the four-stroke combustion to reduce transient torque affects of the cylinder combustion cycle mode transition.

19. A method of starting an engine, the engine having at least a cylinder and a compression device coupled to an intake of the engine, the compression device driven at least partially by an electric machine, the method comprising:
   generating boost in the intake by driving the compressor with at least the electric machine during engine starting, the electric machine driving the compressor during engine cranking of the engine and before a first combustion event in the cylinder, the first combustion event in the cylinder being a first combustion event from engine rest;
   adjusting the electric machine based on an battery state of charge during the start;
   inducting air during the start into the cylinder through at least one poppet valve coupled to the cylinder;
   adjusting a fuel injection amount based on the electric machine operation; and
   commencing combustion in the cylinder from a non-combusting condition, the combustion in a two-stroke combustion cycle of the cylinder, the non-combusting condition being a vehicle stopped and engine stopped condition, where the engine is automatically shut-down during stopped vehicle conditions independent from a vehicle operator shut-down request.

20. The method of claim 18 further comprising adjusting a spark timing based on the electric machine operation.

* * * * *